United States Patent [19]

Montagu

[11] Patent Number: 4,502,752
[45] Date of Patent: Mar. 5, 1985

[54] RESONANT ACTUATOR FOR OPTICAL SCANNING

[75] Inventor: Jean I. Montagu, Brookline, Mass.

[73] Assignee: General Scanning, Inc., Watertown, Mass.

[21] Appl. No.: 439,925

[22] Filed: Nov. 8, 1982

[51] Int. Cl.³ ............................................. G02B 27/17
[52] U.S. Cl. ...................................... 350/6.6; 310/27; 310/36; 318/128
[58] Field of Search ................. 350/6.6, 487, 6.5, 6.1, 350/484; 310/27, 36; 318/128, 132; 324/97, 154, 151 R

[56] References Cited

U.S. PATENT DOCUMENTS

| | | | |
|---|---|---|---|
| 1,644,789 | 10/1927 | Nordenswan . | |
| 1,711,285 | 4/1929 | Peterson . | |
| 2,326,252 | 8/1943 | Rich | 171/95 |
| 2,351,353 | 6/1944 | McCarty | 171/95 |
| 2,380,164 | 7/1945 | Goldsborough | 175/294 |
| 2,380,165 | 7/1945 | Goldsborough | 175/294 |
| 2,613,254 | 10/1952 | King | 175/335 |
| 2,762,000 | 9/1956 | Matthews | 317/168 |
| 2,993,403 | 7/1961 | Harries | 88/14 |
| 3,161,793 | 12/1964 | Laithwaite | 310/27 |
| 3,252,053 | 5/1966 | Paddison | 317/58 |
| 3,585,458 | 6/1971 | Yoshimura | 317/156 TR |
| 3,624,574 | 11/1971 | Montagu | 335/230 |
| 3,694,782 | 9/1972 | Ray | 335/230 |
| 3,799,644 | 3/1974 | Street | 350/486 |
| 3,867,696 | 2/1975 | Raymond | 324/146 |
| 3,959,673 | 6/1976 | Montagu | 310/38 |
| 4,047,136 | 9/1977 | Satto | 335/222 |
| 4,076,998 | 2/1978 | Montagu | 318/132 |
| 4,090,131 | 5/1978 | Mas | 324/146 |
| 4,134,062 | 1/1979 | Pizzuti et al. | 324/125 |
| 4,145,725 | 3/1979 | Wallis | 310/36 |
| 4,186,332 | 1/1980 | Montagu | 318/128 |
| 4,197,494 | 4/1980 | Van De Werken | 324/146 |
| 4,290,356 | 9/1981 | Hehl | 101/93.94 |
| 4,302,720 | 11/1981 | Brill | 324/146 |
| 4,317,095 | 2/1982 | Jankiewicz | 335/149 |
| 4,346,416 | 8/1982 | Riggle et al. | 360/106 |
| 4,358,695 | 11/1982 | MacDonald et al. | 310/105 |
| 4,358,696 | 11/1982 | Liu et al. | 310/156 |
| 4,358,697 | 11/1982 | Liu et al. | 310/156 |
| 4,370,613 | 1/1983 | Montagu | 324/154 |
| 4,383,192 | 5/1983 | Sikorra | 310/154 |
| 4,398,167 | 8/1983 | Dickie et al. | 335/272 |

FOREIGN PATENT DOCUMENTS

| | | |
|---|---|---|
| 750070 | 12/1944 | Fed. Rep. of Germany . |
| 1001400 | 1/1957 | Fed. Rep. of Germany . |
| 1089881 | 9/1960 | Fed. Rep. of Germany . |
| 167446 | 1/1922 | United Kingdom . |

*Primary Examiner*—Jon W. Henry

[57] ABSTRACT

An optical scanner or actuator comprising an armature which includes a movable, closed electrically conductive loop, the armature being mounted to rotate about a support axis, current inducing means associated with the electrically conductive loop comprising a stationary flux-conductor extending through and in current-inducing relationship with the loop, and drive means adapted to induce a magnetic current-inducing flux along the flux-conductor in accordance with desired movement of the armature, permanent magnet biasing means comprising a permanent magnet adapted to produce a magnetic field with which current in the electrically conductive loop interacts to cause movement of the armature, one pole of the magnet being permeably connected to one portion of the flux-conductor at a region remote from the electrically conductive loop, and the other pole of the magnet being permeably connected with the flux-conductor via a permeable gap in which a segment of the electrically conductive loop is arranged to move, whereby bias magnetic flux and current-inducing flux share in part the same permeable path along the flux-conductor, and a circuit for controlling the drive means to produce a varying flux in the flux-conductor to cause the armature to rotate back and forth about the support axis. In the form of a resonant scanner, an optical element is attached to the armature in the vicinity of the support axis and arranged to receive a beam to be directed by the optical element, and the control circuit produces signals to induce a varying current in the closed movable electrically-conductive loop to produce resonant scanning motion of the optical element.

16 Claims, 5 Drawing Figures

RESONANT ACTUATOR FOR OPTICAL SCANNING

BACKGROUND OF THE INVENTION

The invention relates to beam scanners and the like.

In scanners used for rapidly scanning a beam back and forth along a line, the optical scanning element oscillates about an axis with rotary motion. In order to minimize the driving energy, it is often desired that the scanner be highly resonant, i.e. characterized by a spring-mass system having a high (Q) factor. Certain resonant scanners are severely limited in rotational speed or in the maximum angular excursion that can be obtained. Other scanners are subject to internally induced perturbations that cause detrimental wobbling of the optical element.

In cases where it is desired to employ externally generated drive signals to control a scanner or other rotating oscillator, difficulty and expense are involved in seeking to match the drive signals to the oscillating mechanical system.

The invention is directed to overcoming these difficulties and achieving improved scanning performance and simple and low cost actuator constructions.

SUMMARY OF THE INVENTION

In general, the invention features an optical scanner or actuator comprising an armature which includes a movable, closed electrically conductive loop, the armature being mounted to rotate about a support axis, current inducing means associated with the electrically conductive loop comprising a stationary flux-conductor extending through and in current-inducing relationship with the loop, and drive means adapted to induce a magnetic current-inducing flux along the flux-conductor in accordance with desired movement of the armature, permanent magnet biasing means comprising a permanent magnet adapted to produce a magnetic field with which current in the electrically conductive loop interacts to cause movement of the armature, one pole of the magnet being permeably connected to one portion of the flux-conductor at a region remote from the electrically conductive loop, and the other pole of the magnet being permeably connected with the flux-conductor via a permeable gap in which a segment of the electrically conductive loop is arranged to move, whereby bias magnetic flux and current-inducing flux share in part the same permeable path along the flux-conductor, and a circuit for controlling the drive means to produce a varying flux in the flux-conductor to cause the armature to rotate back and forth about the support axis. In the form of a resonant scanner, an optical element is attached to the armature in the vininity of the support axis and arranged to receive a beam to be directed by the optical element, and the control circuit produces signals to induce a varying current in the closed movable electrically-conductive loop to produce resonant scanning motion of the optical element.

In preferred embodiments, there is an armature-supporting structure having a flexural support constructed and arranged to impose a restorative force tending to return the armature from a deflected position to its neutral position, the armature and the armature-supporting structure having a resonant frequency of rotational motion; the flexural support is a torsion bar assembly; the torsion bar assembly has a pair of coaxial, axially spaced-apart torsion bars with the armature held between the respective ends of the bars, the torsion bars defining the support axis; the armature is balanced and the armature-supporting structure is arranged to prevent external forces imposed in any direction on the armature-supporting structure from causing rotation of the armature about a predetermined axis normal to the support axis; the motion of the armature is characterized by a quality factor for resonating system (Q) of at least 200, preferably in many cases 1,000 or more; the circuit has a sensor responsive to rotation of the armature, and feedback circuitry responsive to the sensor for providing control signals to the drive means; the sensor has a pickoff coil wound around the flux-conductor for providing a signal indicative of the flux induced in the flux-conductor by rotation of the armature; the feedback circuitry has an adjustable gain means for controlling the amplitude of rotational excursion of the armature; in an externally driven system the permanent magnet is selected to provide substantial magnetic damping that facilitates the matching of the frequency of the driving signals to the natural oscillating frequency of the mechanical scanning system; the drive means has a coil wound around the flux-conductor; and the flux-conductor and the permanent magnet stator comprise respective opposed, concentric, arcuate surfaces of different radii centered on the support axis, the surfaces defining an arcuate gap, the conductive loop having a segment disposed within the gap in a direction parallel to the support axis and normal to flux lines produced by the permanent magnet and passing through the gap between the arcuate surfaces, whereby the force on the loop caused by the interaction of the permanent magnetic field and the induced current in the loop is uniform regardless of the angular position of the segment of the loop within the gap.

The actuator enables efficient, resonant, wide-excursion motion to be achieved in a compact, inexpensive unit and without susceptability to undesired wobbling of the optical element; the optical element can be attached close to the support axis to minimize rotational inertia; the sharing of flux paths by the drive means and the permanent magnet enables the pickoff coil to accurately determine the velocity of the armature; the property of the permanent magnet, that it is not permeable to externally generated magnetic fields, prevents short circuiting of the flux induced by the drive coil; the rotational motion of the armature need not be damped by bearings, brushes or leads connected to the movable loop; the degree of damping of the system is selectable e.g. by selection of the strength of the permanent magnet; and the amplitude of resonance is adjustable.

Other advantages and features will be apparent from the following description of the preferred embodiment, and from the claims.

DESCRIPTION OF THE PREFERRED EMBODIMENT

We first briefly describe the drawings.

Drawings

FIG. 5 is a diagrammatic view of a scanner, according to the invention, driven by an external source.

STRUCTURE

Figure 1:
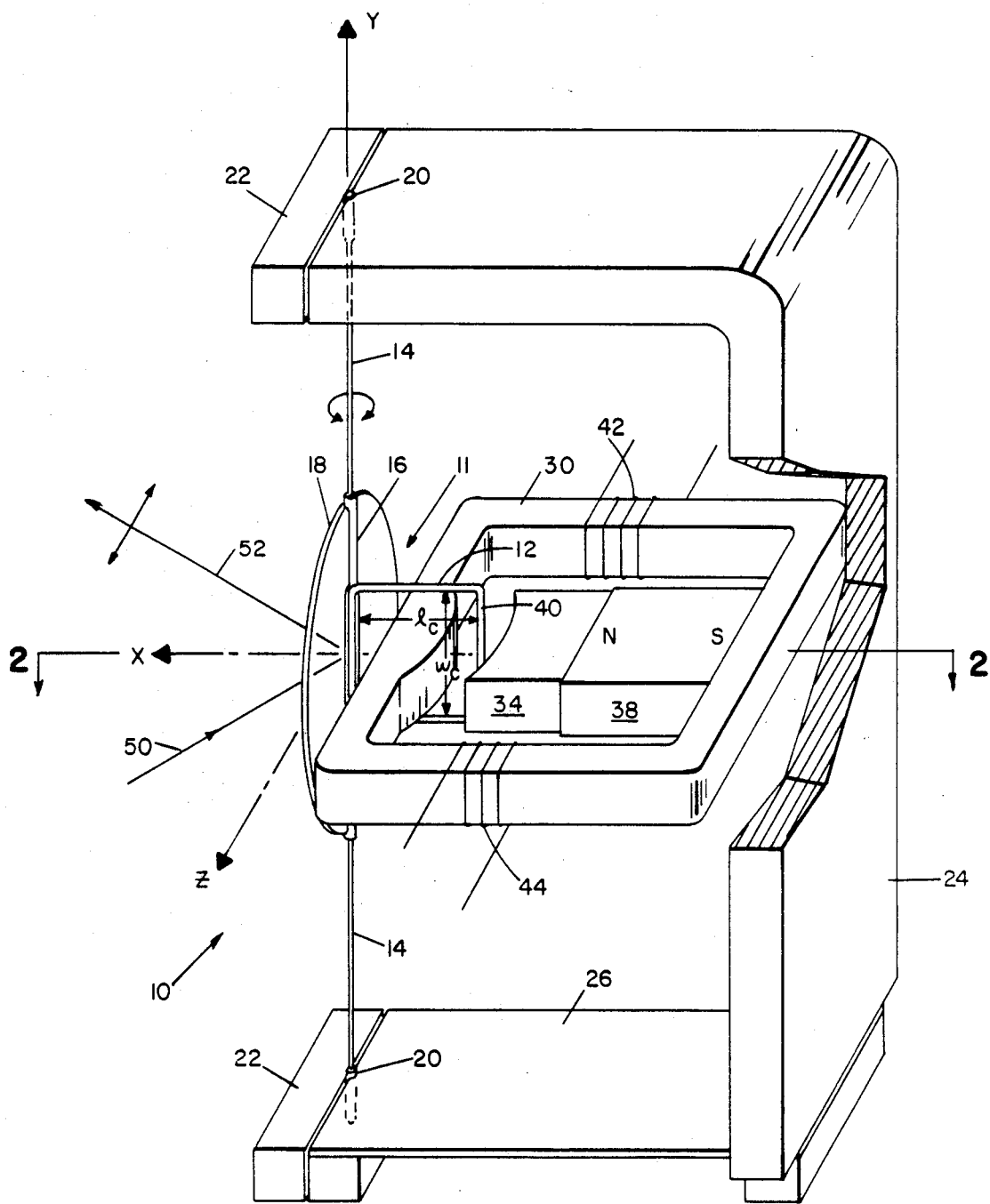
FIG. 1 is an isometric view, partially broken away, of a resonant scanner.

Referring to FIG. 1, scanner 10 has an armature 11 comprising a rectangular closed, electrically conductive coil or loop 12 ($L_c=0.25$ inches by $W_c=0.200$ inches) of 0.020 inch by 0.050 inch cross-section 6061 T4 aluminum wire. Loop 12 is soldered to a torsion bar assembly comprising a pair of 0.026 inch diameter, 1-inch long carbon spring steel torsion bars 14, each soldered on one end to a mirror/loop support 16. Support 16 is a 0.124 inch diameter invar (0.003" copper-plated) piece, having flats cut on opposite sides, one flat providing a mounting surface for the loop 12. The second flat provides a mounting surface for a 0.400 inch round, 1 millimeter thick silvered quartz flat mirror 18.

The opposite ends of the torsion bars 14 are each soldered to a 0.124 inch diameter cylindrical bead 20. The pair of beads 20 are held respectively by clamps 22. One clamp 22 is screw mounted to the end of an L-shaped aluminum support 24; the other clamp 22 is screw mounted to one end of a 0.020" thick spring steel blade 26, the other end of which is secured to support 24, blade 26 being pre-stressed so that the torsion bars 14 are placed under tension.

The torsion bar assembly, conductive loop and mirror form a mass-spring system which can rotate about an axis y (colinear with bars 14) with very low drag. The mass/spring system has a neutral position at which mirror 18 lies in a plane defined by axis y and an axis z, axis x being normal to the surface of mirror 18 in this position. When mirror 18 is in any angular position other than the neutral position, torsion bars 14 tend to return it to the neutral position with a force proportional to the angular displacement from the neutral position.

Also mounted on stationary support 24 is 0.625 inch square permeable ring 30 of 0.75 inch by 0.150 inch cross-section nickel iron (Carpenter 49 available from Carpenter Steel Corporation) arranged to extend through the rotatable loop 12.

Figure 2:
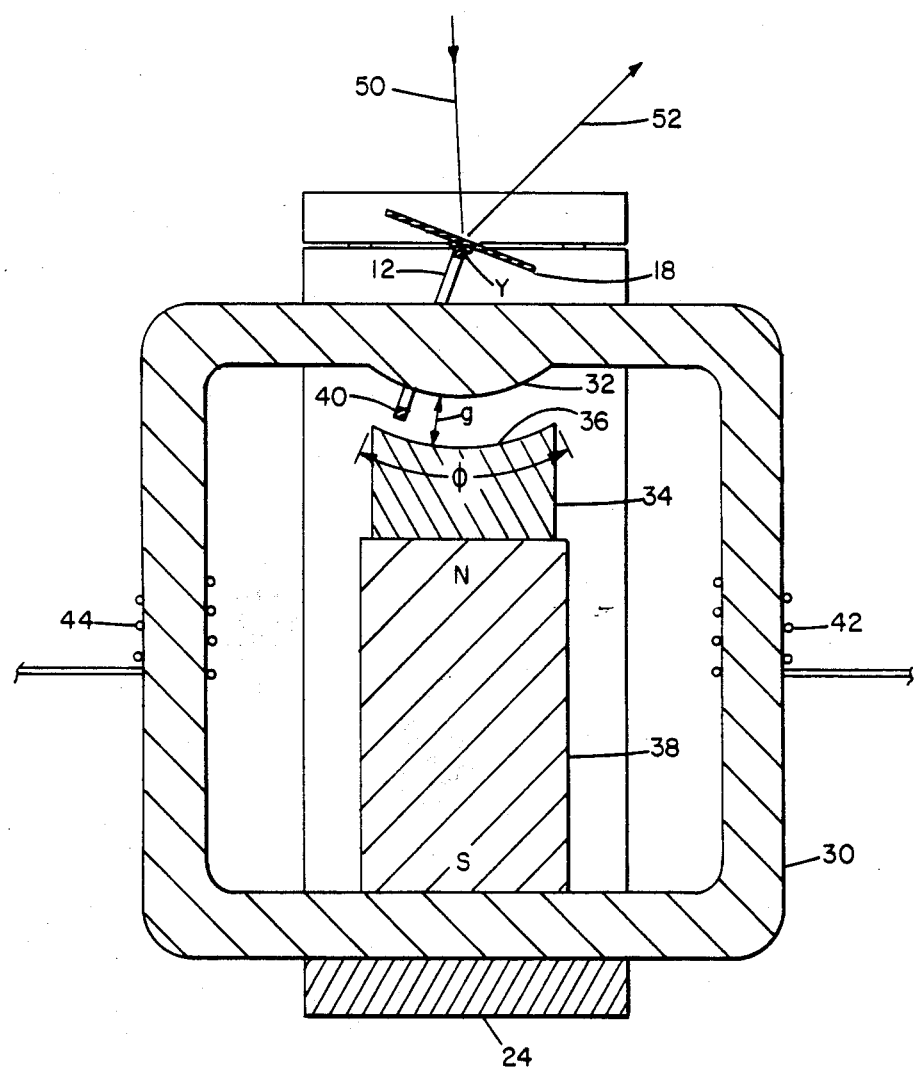
FIG. 2 is a cross sectional view (at 2-2 in FIG. 1) of the resonant scanner.

Referring to FIG. 2, in the region where it extends through conductive loop 12, permeable ring 30 has a convexly rounded surface 32 with a 0.215 inch radius centered on the y axis. Opposite surface 32 a pole piece 34 of nickel iron (Carpenter 49) has a corrresponding concave arcuate surface 36 of radius 0.285 inches centered on axis y, surfaces 32 and 36 thereby defining a 0.070" gap g having an arcuate extent $\phi$ of about 60°, (providing a useful range of rotation up to about 35°). The other end of pole piece 34 is permeably connected to the north pole of samarium cobalt permanent magnet 38 (having an energy of 20 million gauss-oersteds). The south pole of magnet 38 is in turn permeably connected to permeable ring 30 at a region remote from the gap g.

Thus permanent magnet 38 establishes a flux across gap g and in either direction, half-way around the ring 30 to the other pole of the permanent magnet, with all of the flux lines across gap g being substantially radial to axis of rotation y. Segment 40 of loop 12 (i.e., the side opposite mirror 18) extends parallel with axis y and lies within gap g. It rotates through an arc within gap g as mirror 18 rotates on axis y.

On one side of ring 30, a drive coil 42 having 250 turns of number 32 copper wire (and a resistance of approximately 2.5 ohms) is wound and on the opposite side of ring 30 is wound a pickoff coil 44 with the same specifications.

Optical beam 50 is reflected from mirror 18 so that rotation of mirror 18 causes reflected beam 52 to track a line. The torsion bar assembly is so designed and the mass of the mirror 18 and armature 11 are so balanced about the various axes x, y and z that linear or rotational disturbances to scanner 10 do not shift the angle of the path of beam 52 (with respect to axis x) regardless of the direction or axis of the disturbance, except for certain correctable shifts caused by rotational disturbances about the y axis and rotational disturbances about the z axis (which can be isolated by use of an appropriate mounting device, not shown, between support 24 and the chassis on which support 24 is mounted). Balancing armature 11 and mirror 18 with respect to axis y assures that linear disturbances in the x axis direction cause only linear displacement of mirror 18 along the z axis and a rotational disturbance about the x axis, of course, will not disturb the angle of reflection of beam 52. Rotational disturbances about the y axis are correctable by the feedback loop (described below) which controls rotation about the y axis. Rotation about the z axis is reduced to about 1 arc-second by proper mounting of scanner 10 (e.g., on an H-shaped soft support as in FIG. 4).

Figure 3:
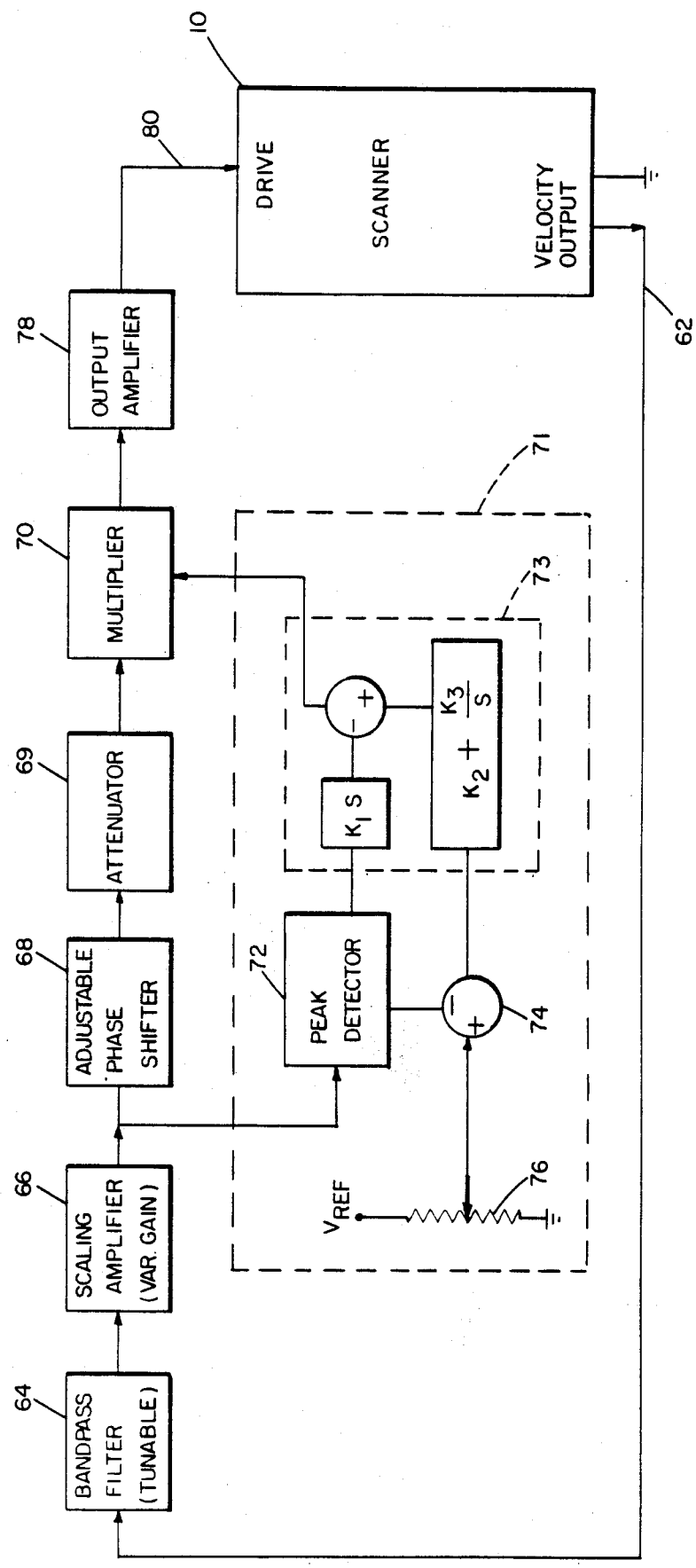
FIG. 3 is a block diagram of control circuitry.

Referring to FIG. 3, scanner 10 has a lead 62 from pickoff coil 44 which serves as an input to a feedback circuit for establishing resonant oscillations of and controlling the amplitude of the oscillations of mirror 18. Band pass filter 64 uses the pickoff coil signal as its input and provides a filtered velocity value to scaling amplifier 66 which adjusts the signal to be in phase with the motion of scanner 10. The output of phase shifter 68 is sent both to multiplier 70 and peak detector 72. The signal peak value is sent to comparator 74 for comparison with a set value from potentiometer 76 and the comparator output is used to drive a proportional-integral-derivative controller 73 which delivers its output to multiplier 70 for multiplication with the signal from phase shifter 68. The output of multiplier 70 is fed through amplifier 78 to drive coil lead 80 of scanner 10.

Figure 4:
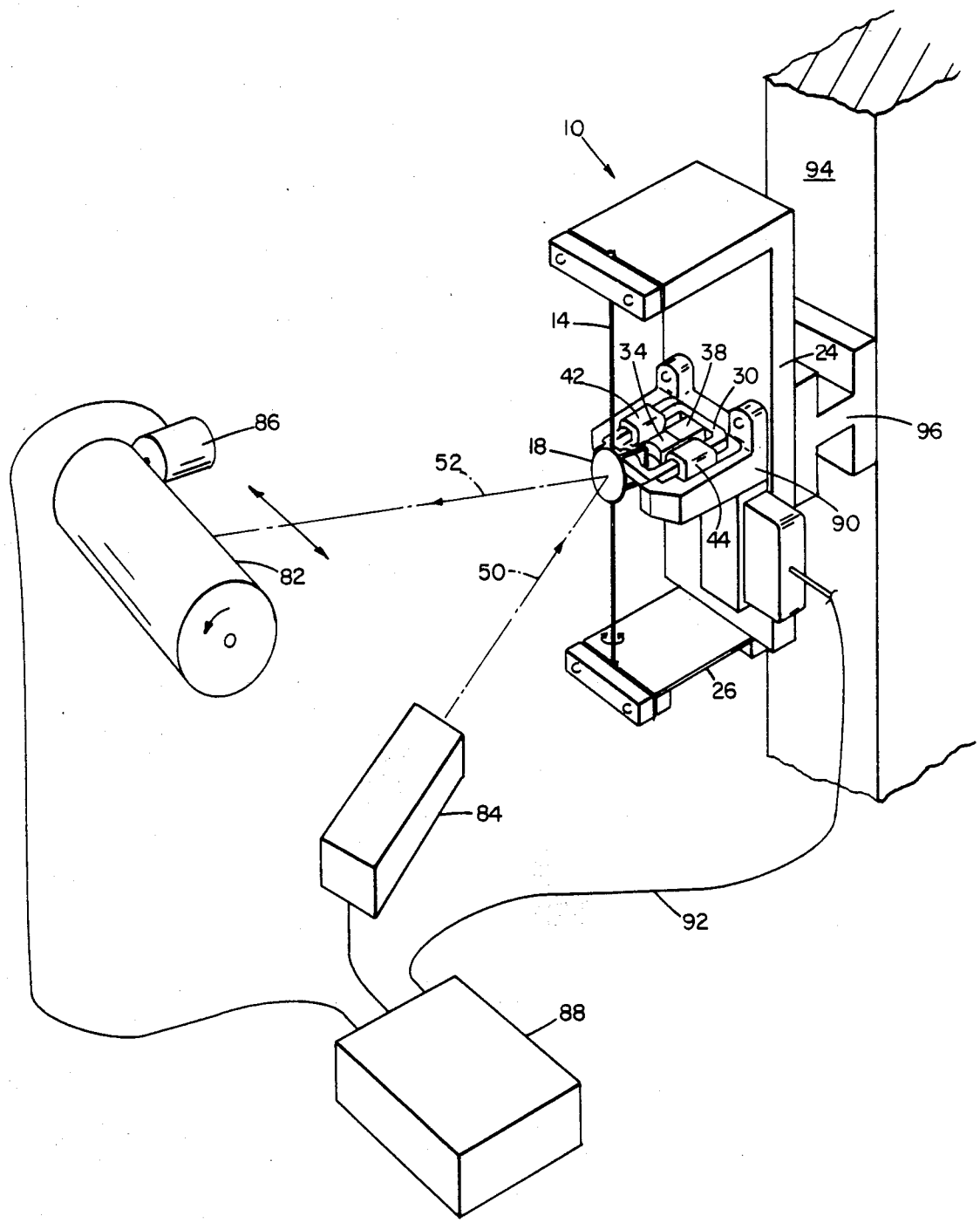
FIG. 4 is a partially isometric view (not to scale) of a laser scanning system.

Referring to FIG. 4, in a so-called intelligent photocopying machine, scanner 10 line scans reflected laser beam 52 across laser-beam-sensitive drum 82. Solid-state laser beam source 84, drum drive 86 and scanner 10 are all connected to controller 88. In scanner 10, ring 30, magnet 38 and pole piece 34 are all supported in molded plastic housing 90 which is bolted to support 24. Housing 90 provides a receptacle for connecting drive coil and pickoff coil leads through conventional cable connector 92 to controller 88. Support 24 is held on chassis 94 by H-shaped soft support 96, which absorbs rotational perturbations to the chassis, preventing wobbling of mirror 18.

OPERATION

By applying a changing current to drive coil 42, flux is induced in flux-conductor ring 30 in a direction which corresponds to the direction of change of the current. This flux induced in ring 30 in turn induces a current in the loop 12 of the armature whose magnitude and direction depends on the magnitude and direction of the flux induced in ring 30. The reaction of the current in the loop of armature 12 against the field lines across gap g (set up by pole piece 34) impose a torque tending to rotate armature 11 (and hence mirror 18) about axis y. The working torque is free of radial components so there is no tendency for mirror 18 to move in any other direction or about any other axis than axis y.

The flux H induced in ring 30 is related to the current I in the drive coil in accordance with Ampere's law, HL=NI, where L is the length of the ring and N is the number of turns in the drive coil. According to Faraday's law, the potential e on the armature, generated by flux H, is $$e = -uA \frac{dH}{dt} \quad (1)$$

where A is the cross-sectional area and u is the permeability of ring 30. Assuming an alternating drive current of the form $I=I_o \sin wt$ (where w is the resonant frequency of the armature/support system), the induced voltage is also alternating and of the form:

$$e = -u \frac{A}{L} NI_o w \cos wt \quad (2)$$

and the resulting alternating current $I_a$ in the armature (assuming it has a resistance R) is:

$$I_a = \frac{e}{R} = -u \frac{A}{L} \frac{NI_o}{R} w \cos wt \quad (3)$$

The resulting torque T on segment 40 is:

$$T = BlI_a r \quad (4)$$

where l is the length of the portion of the armature loop in gap g, r is the radius from the y axis to segment 40 of the armature, and B is the field of magnet 38. Thus $$T = \frac{-u ANI_o Bl}{LR} rw \cos wt \quad (5)$$

that is, there is an oscillating torque imposed on the armature.

The torque will tend to cause armature 11 to rotate with angular velocity ($d\theta/dt$) which will induce a potential (E) in the armature loop defined by $$E = Blr \frac{d\theta}{dt} \quad (6)$$

producing a current ($I_D$) in the armature loop which is $$I_D = \frac{E}{R} = \frac{Blr}{R} \frac{d\theta}{dt} \quad (7)$$

and a corresponding damping torque ($T_D$) of opposite sign from T, $$T_D = BlI_D r \quad (8)$$

or $$T_D = \frac{(Blr)^2}{R} \frac{d\theta}{dt} \quad (9)$$

Assuming that the motion of the armature is that of a second-order system with inertia J and spring constant k with mechanical damping C, then the equation of motion of the armature when subjected to the above-described torques will be $$J \frac{d^2\theta}{dt^2} + T_D + C \frac{d\theta}{dt} + k\theta = -T \quad (10)$$

that is $$J \frac{d^2\theta}{dt^2} + \left[ \frac{(Blr)^2}{R} + C \right] \frac{d\theta}{dt} + k\theta = u \frac{ANI_o}{LR} Blr w \cos wt \quad (11)$$

where the resonant frequency of motion of the system $$\left( w = \sqrt{\frac{k}{J}} \right)$$

is (by operation of the feedback loop) also the frequency of the driving coil current, so that $$\frac{d^2\theta}{dt^2} + \left[ \frac{(Blr)^2}{RJ} + \frac{C}{J} \right] \frac{d\theta}{dt} + w^2\theta = \frac{uANI_o B}{LRJ} lrw \cos wt \quad (12)$$

which can be simplified to $$\frac{d^2\theta}{dt^2} + Cd\theta/dt + w^2\theta = D \cos wt \quad (13)$$

where $C = \frac{(Blr)^2 + CR}{RJ} \quad (14)$ and $D = \frac{uANI_o Blrw}{LRJ} \quad (15)$ and the solution is $$e = \frac{D}{CW} \sin wt \quad (16)$$

or $$e = \frac{uANI_o Blr}{L[(Blr)^2 + CR]} \sin wt \quad (17)$$

Where the damping ratio $\delta$ is defined as $\delta = (C/2w)$ the solution simplifies to $$\theta = \frac{uANI_o Blr}{2\delta wLRJ} \sin wt \quad (18)$$

where $$\delta = \frac{1}{2\sqrt{JK}} \left[ \frac{(Blr)^2}{R} + C \right] \quad (19)$$

Thus the armature motion is resonant with the damping ratio having two terms, the first based on the magnetic damping of torque $T_D$, the other based on the mechanical damping of the torsion bar/armature system. It is desirable to have the magnetic and mechanical damping terms roughly matched and, for resonant operation, to have the smallest possible values. The magnetic damping can be fixed at a desired level by appropriate selection of the strength of the permanent magnet field, the length of the armature loop segment in the gap (g), the operation radius (r), and the resistance of the armature loop (R). Note that the magnetic damping operates only with respect to rotational motion about the y axis.

The mechanical resonance can be adjusted by bending small tabs on support 16 toward or away from the center of rotation thereby adjusting the system's inertia.

The potential $e_p$ at the pickoff coil 44 is a function of flux induced in ring 30 from two sources, the drive coil current and the armature motion. The fluxes from the two sources share in part the same permeable path along the flux-conductor.

With pickoff coil 44 and drive coil 42 having the same number of turns (N), $$e_p = u\frac{A}{L} N^2 w I_o \cos wt + NBlr\frac{d\theta}{dt} \quad (20)$$

The angular velocity of the armature ($d\theta/dt$) based on the above solution for $\theta$ is $$\frac{d\theta}{dt} = \frac{uANI_oBlrw}{L[(Blr)^2 + CR]} \cos wt \quad (21)$$

so that $$e_p = u\frac{A}{L} I_o N^2 w \cos wt \left[1 + \frac{1}{1 + \frac{CR}{(Blr)^2}}\right] \quad (22)$$

In this equation the velocity term $$\left(\frac{1}{1 + \frac{CR}{(Blr)^2}}\right)$$

(related to the angular velocity of the armature) and the transformer term (i.e., 1) (related to the drive coil current) are of the same phase and similar magnitude. Thus, by subtracting from $e_p$ a voltage of proper amplitude and phase derived from drive coil 42, the resulting voltage will be proportional to the armature angular velocity and can be used in feedback control circuitry to maintain the oscillating motion of the armature at the resonant frequency and at a controllable amplitude level.

Referring to FIG. 3, output line 62 from scanner 10 provides a voltage proportional to the angular velocity of armature 11 (i.e., equal to pickoff coil 44 voltage $e_p$ offset by the drive coil 42 voltage) which is filtered in adjustable bandpass filter 64 which is tuned to the resonant frequency of scanner 10 to reduce distortion in the velocity signal. The filtered signal is then scaled to a proper amplitude for use in the automatic gain control circuitry 71 to which it is fed. In circuitry 71, peak detector 72 delivers a DC voltage equal to the positive peak amplitude of the filtered and scaled velocity signal. That DC voltage is then fed to comparator 74 where it is compared with a variable reference voltage from potentiometer 76 (indicative of the desired amplitude of resonance). The outputs of comparator 74 and detector 72 are both bed to a conventional proportional-integral-derivative control block 73 which has a transfer function equal to $$k_1 S + k_2 S + \frac{k_3}{S}.$$

The integral term $k_3/S$ ensures that the steady-state error of the scanner amplitude with respect to the variable reference signal will be zero. The output of block 73 controls the gain of multiplier 70.

Multiplier 70 receives its other input from the output of scaling amplifier 66 after it has been phase corrected in phase shifter 68 (to ensure a 360° closed-loop phase shift) and passed through adjustable attenuator 69 (which assures that the input to the multiplier is within the multiplier's linear operating range). The output of multiplier 70 provides the input to amplifier 78 which delivers a drive current to drive coil 42.

Scanner 10 has the following approximate specifications:
J = 0.04 gram-cm² (mirror plus armature)
r = 0.635 cm
l = 0.312 cm
N = 250 turns
$I_o$ = 0.2 amps
B = 0.5 weber/m₂
L = 6.35 cm
A = 73 × 10⁻³ cm²
w = 1 kHz = 2π10³ radians/sec
R = 0.868 × 10⁻³ ohms
u = 5000 × 4π10⁻⁷
k = 1.61 × 10³ gram-cm/radian
C = 25 × 10⁻⁹ (mks system)
d = 27.5 × 10⁻³
Q = 182
θ = 13.7 degrees (estimated) peak excursion
power consumption = ¼ watt Referring again to FIG. 4, controller 88 can modulate the intensity of laser source 84 in accordance with a desired changing image brightness along a succession of lines on a page to be generated. Controller 88 coordinates the frequency and amplitude of the resonance of scanner 10 and the advancement of drum 82 by drum drive 96 with the modulation of the intensity of source 84 so that the image scanned over the surface of drum 82 corresponds with the page to be generated. Scanning can proceed at 300 lines per inch at a speed of 1000 lines per second over an 8½"×11" surface with the scanner mirror rotating through 30° peak-to-peak.

The system can thus achieve with simple construction, a wide angle excursion with a small motor and low power, with great accuracy and with a long expected life.

In another embodiment, FIG. 5, an external source 100 is employed to produce the drive signals. Such an arrangement may be accomplished by disconnecting the connection in FIG. 3 between altenator 69 and multiplier 70 to break the feedback loop and feeding the drive source signal to the multiplier. In this case the permanent magnet of the scanner is chosen to provide a considerably stronger field B, with the result that the damping torque (see equations 8 and 9) is made higher as a result of magnetic damping. This lowers the Q of the spring-mass system and by this, increases the range of permissible mismatch between the frequency of the external drive signal and the natural resonant frequency of the scanner, thus making it practical to employ a relatively low-cost external drive source and scanner.

OTHER EMBODIMENTS

Other embodiments are within the following claims.

I claim:

1. A resonant optical scanner device comprising an armature which includes a movable, closed electrically conductive loop, said armature being mounted to rotate about a support axis, current inducing means associated with said electrically conductive loop comprising a stationary flux-conductor extending through and in current-inducing relationship with said loop, and drive means adapted to induce a magnetic current-inducing flux along said flux conductor in accordance with desired movement of said armature, permanent magnet biasing means comprising a permanent magnet adapted to produce a magnetic field with which current in said electrically conductive loop interacts to cause movement of said armature, one pole of said magnet being permeably connected to one portion of said flux-conductor at a region remote from said electrically conductive loop, and the other pole of said magnet being permeably connected with said flux-conductor via a permeable gap in which a segment of said electrically conductive loop is arranged to move, whereby bias magnetic flux and current-inducing flux share in part the same permeable path along said flux-conductor, an optical element attached to said armature in the vicinity of said support axis and arranged to receive a beam to be directed by said optical element, and a circuit for controlling said drive means to produce a varying flux in said flux-conductor to induce a varying current in said closed movable electrical conductive loop to cause said armature and attached optical element to rotate back and forth about said support axis, in resonant scanning motion.

2. The device of claim 1 wherein said optical element comprises a planar mirror mounted on the side of said loop opposite from the location of said permanent magnet, said mirror, armature and support means therefor comprising a resonant assembly that is mass-balanced so that acceleration produces substantially only translation of said planar mirror.

3. An actuator comprising an armature which includes a movable, closed electrically conductive loop, said armature being mounted to rotate about a support axis, current inducing means associated with said electrically conductive loop comprising a stationary flux-conductor extending through and in current-inducing relationship with said loop, and drive means adapted to induce a magnetic current-inducing flux along said flux-conductor in accordance with desired movement of said armature, permanent magnet biasing means comprising a permanent magnet adapted to produce a magnetic field with which current in said electrically conductive loop interacts to cause movement of said armature, one pole of said magnet being permeably connected to one portion of said flux-conductor at a region remote from said electrically conductive loop, and the other pole of said magnet being permeably connected with said flux-conductor via a permeable gap in which a segment of said electrically conductive loop is arranged to move, whereby bias magnetic flux and current-inducing flux share in part the same permeable path along said flux-conductor, and a scanning element attached to said armature in the vicinity of said support axis and arranged for back and forth resonant motion in relation to a scanning axis.

a circuit for controlling said drive means to produce a varying flux in said flux-conductor to induce a varying current in said closed movable electrical conductive loop to cause said armature to rotate back and forth about said support axis, in resonant scanning motion.

4. The device of claim 1 or 3 further comprising an armature-supporting structure comprising an elastic flexural support constructed and arranged to impose a restorative force tending to return said armature from a deflected position to its neutral position, said armature and said armature-supporting structure having a resonant frequency of rotational motion.

5. The device of claim 4 wherein said elastic flexural support comprises a torsion bar assembly.

6. The device of claim 5 wherein said torsion bar assembly comprises a pair of coaxial, axially spaced apart torsion bars with said armature held between the respective ends of said bars, said torsion bars defining said support axis.

7. The device of claim 6 wherein an elongated supporting element aligned with said axis is connected between said torsion bars, a planar mirror mounted on one side of said supporting element, and said loop extending, in perpendicular relationship to said mirror, from the oppositely directed side of said supporting element.

8. The device of claim 4 wherein the motion of said armature and associated moving structure is characterized by a (Q) (quality factor for a resonant system) of at least 200.

9. The device of claim 1 or 3 wherein said circuit for controlling said drive means comprises a sensor responsive to rotation of said armature, and feedback circuitry responsive to said sensor for providing control signals to said drive means, said sensor comprising a pickoff coil wound around said flux-conductor for providing a signal indicative of the flux induced in said flux-conductor by rotation of said armature.

10. The device of claim 9 wherein said feedback circuitry comprises an adjustable gain means for controlling the amplitude of rotational excursion of said armature.

11. The device of claim 1 or 3 wherein said drive means comprises a coil wound around said flux-conductor.

12. The device of claim 1 or 3 wherein said flux-conductor is of symmetrical form having a pair of legs spaced from and in flux-conducting relationship with said permanent magnet, a coil wound about each of said legs, one of said coils connected to serve as said drive means and the other of said coils arranged to serve as pick off for sensing the velocity of said armature.

13. The device of claim 1 or 3 wherein said flux-conductor and said permanent magnet comprise respective opposed surfaces parallel to said support axis, defining said gap, said conductive loop comprising a segment disposed within said gap in a direction parallel to said support axis and normal to flux lines produced by said permanent magnet and passing through said gap between said surfaces.

14. The device of claim 13 wherein said opposed surfaces are arcuate, concentric surfaces of different radii centered on said support axis, whereby the force on said loop caused by the interaction of said permanent magnetic field and said induced current in said loop is uniform regardless of the angular position of said segment of said loop within said gap.

15. The device of claim 1 or 3 constructed so that said movement of said armature is produced by a torque resulting from the interaction of said magnetic field and the current in said loop, said torque being of the form $$T = KBI_a$$

where B is the field strength of said permanent magnet, K is a constant, and $I_a$ is the current induced in said loop, and wherein the motion of said armature causes a damping torque of the form $$T_D = FB(d\theta/dt)$$

where F is a constant dependent on the configuration of said loop and said flux-conductor and $\theta$ is the angular position of said armature.

16. The device of claim 15 cnstructed so that damping both as a result of said magnetic damping torque dependent on the field strength of said permanent magnet, and mechanical damping are so minimized as to provide a (Q) (quality factor for a resonant system) of the order of 1,000 or more.

* * * * *

UNITED STATES PATENT AND TRADEMARK OFFICE
CERTIFICATE OF CORRECTION

PATENT NO. : 4,502,752
DATED : March 5, 1985
INVENTOR(S) : Jean I. Montagu

It is certified that error appears in the above-identified patent and that said Letters Patent are hereby corrected as shown below:

Col. 1, line 54, "vininity" should be --vicinity--;

Col. 6, line 3, "kθ" should be --$\underline{k\theta}$--;

Col. 6, line 29, both "C" and "D" should be underscored, thus --$\underline{C}$-- and --$\underline{D}$--;

Col. 6, line 33, "C" should be --$\underline{C}$--;

Col. 6, line 35, "D" should be --$\underline{D}$--;

Col. 6, line 40, "e" should be --θ-- and "C" should be --$\underline{C}$--;

Col. 6, line 45, "e" should be --θ--;

Col. 6, line 56, "C" should be --$\underline{C}$--;

Col. 7, line 1, "operation" should be --operating--;

Col. 8, line 44, "96" should be --86--;

Col. 12, line 16, "cnstructed" should be --constructed--.

Signed and Sealed this

Eleventh Day of February 1986

[SEAL]

Attest:

DONALD J. QUIGG

*Attesting Officer*     *Commissioner of Patents and Trademarks*